United States Patent [19]
Ohashi

[11] Patent Number: 5,581,783
[45] Date of Patent: Dec. 3, 1996

[54] SYSTEM FOR CAPTURING MULTIMEDIA INFORMATION USING A HAND WRITING STYLUS PEN WHICH PERFORMS SIGNAL-TO-DATA CONVERSION INSIDE THE PEN AND STORES DATA IN THE MEMORY INSIDE THE PEN

[75] Inventor: Katsuyuki Ohashi, Kawasaki, Japan

[73] Assignee: Fujitsu Limited, Kanagawa, Japan

[21] Appl. No.: 941,539

[22] Filed: Sep. 8, 1992

[30] Foreign Application Priority Data

Sep. 9, 1991 [JP] Japan ................... 3-227582

[51] Int. Cl.$^6$ .............. G06F 15/00; G06F 15/20
[52] U.S. Cl. ............... 395/825; 395/112; 395/106; 395/501; 395/806; 364/709.01; 364/709.11; 358/473; 348/376
[58] Field of Search ................... 345/179, 180, 345/181, 182, 183; 364/709.01, 709.11; 395/106, 112, 162, 825, 154, 375; 358/473; 348/376

[56] References Cited

U.S. PATENT DOCUMENTS

| | | |
|---|---|---|
| 4,136,361 | 1/1979 | Doan .................... 348/376 |
| 4,751,741 | 6/1988 | Mochinaga et al. ............ 382/13 |
| 4,947,261 | 8/1990 | Ishikawa et al. ............. 358/473 |
| 5,007,085 | 4/1991 | Greanias et al. ............. 380/25 |
| 5,027,115 | 6/1991 | Sato et al. ................. 341/13 |
| 5,107,541 | 4/1992 | Hilton ....................... 382/3 |
| 5,187,467 | 2/1993 | Myers ....................... 340/707 |
| 5,230,015 | 7/1993 | Yokodate et al. ............. 379/53 |
| 5,230,041 | 7/1993 | Dinwiddie, Jr. et al. ....... 395/162 |

*Primary Examiner*—Thomas C. Lee
*Assistant Examiner*—Rehana P. Krick

[57] ABSTRACT

A multimedia information capturing apparatus consisting of a hand writing stylus pen and a data processing unit including a write and display tablet operating with the stylus pen. By means of the stylus pen, image and voice data are captured, memorized and transmitted to the data processing unit through a wireless data transmission route, and in the data processing unit, the image and voice data are displayed and sounded on the tablet and from a speaker respectively and text data on the image and voice data is made by operating the stylus pen with the tablet. The data on the captured image and voice and the text data are stored in the data processing unit, and the data stored in the data processing unit can be transfer to the stylus pen through the wireless transmission route and stored in the stylus pen.

9 Claims, 12 Drawing Sheets

SYSTEM FOR CAPTURING MULTIMEDIA INFORMATION USING A HAND WRITING STYLUS PEN WHICH PERFORMS SIGNAL-TO-DATA CONVERSION INSIDE THE PEN AND STORES DATA IN THE MEMORY INSIDE THE PEN

BACKGROUND

1. Field of the Invention

The present invention relates to a multimedia information capturing apparatus for capturing multimedia information so as to transfer the information into a computer system therefrom, and in particular, the present invention relates to the apparatus for capturing image and voice information.

The multimedia information capturing apparatus is widely used but having various steps such as capturing multimedia information, converting the captured multimedia information into electric data, storing the electric data and transferring the stored electric data into a computer system such as a personal computer.

Since the multimedia information capturing apparatus, which will be simply called "multimedia capturing apparatus" hereinafter, becomes more portable recently, the apparatus is required to perform the above various steps in more simple and high efficiency.

2. Description of the Related Art

FIG. 1 shows a block diagram of a portable multimedia capturing apparatus of the prior art. Two multimedia capturing apparatus (100 and 100') are shown in FIG. 1 for explaining an example of data transfer performed between the two apparatus. The multimedia capturing apparatus 100 or 100' consists of a data processing unit (DATA PROC UNIT) 101, an imaging device (IMAGING DEVICE) 102 such as an electronic steal camera, an image data transfer medium (MEDIUM) 103 and a microphone (MIC) 104 attached to DATA PROC UNIT 101. However, there is a feature that both of IMAGING DEVICE 102 and MEDIUM 103 are physically separated from DATA PROC UNIT 101.

The DATA PROC UNIT 101 consists of a computer (COMP) 101a, a monitor (MON) 101b, a keyboard (KEYBOARD) 101c and a pointing mouse (MOUSE) 101d. A hand writing stylus pen (STYLUS PEN) 101e is provided to be used only for KEYBOARD 101c and MOUSE 101d.

The MEDIUM 103 is such as a floppy disc or an IC memory card for storing the image data obtained by IMAGING DEVICE 102 and DATA PROC UNIT 101. By means of MEDIUM 103, the image datum obtained by DATA PROC UNIT 101 is transferred to DATA PROC UNIT 101'.

FIG. 1 shows a case where MEDIUM 103 stores an image datum obtained by IMAGING DEVICE 102 and the image datum in MEDIUM 103 is processed by DATA PROC UNIT 101.

In DATA PROC UNIT 101, COMP 101a reads the image data from MEDIUM 103 and stores it into a memory provided in COMP 101a. A voice signal captured by MIC 104 is converted into digital voice data and stored also in the memory in COMP 101a.

Operating KEYBOARD 101c or MOUSE 101D, the user confirms by monitoring MON 101b that the image datum is stored in the memory and determines a position of an icon on MON 101b by hearing the voice stored in the memory. A multimedia document, which is usually called a text datum, for the captured image and voice data can be made by the user, using KEYBOARD 101c.

In the above explanation, an example of using KEYBOARD 101c and MOUSE 101d is shown. However, recently, STYLUS PEN 101e is widely used instead of KEYBOARD 101c and MOUSE 101d. When STYLUS PEN 101e is used, a tablet, into which data can be written and on which data can be displayed, is used as a monitor. This kind of tablet will be called a "write and display tablet" hereinafter.

When the user wants to transfer the text data from DATA PROC UNIT 101 to DATA PROC UNIT 101', the text data can be transferred by using MEDIUM 103. The text data stored in the memory in COMP 101a of DATA PROC UNIT 101 are stored in MEDIUM 103 once and transferred to the memory in COMP 101a of DATA PROC UNIT 101' as shown by a dotted line in FIG. 1.

As seen from the above explanation, there are problems in the prior art that every time the image datum is captured, processed and transferred, the user must treat IMAGING DEVICE 102, MEDIUM 103, MIC 104, KEYBOARD 101c and MOUSE 101d or STYLUS PEN 101e. In particular, the user must disconnect and connect MEDIUM 103 from DATA PROC UNIT 101 to 101' or the computer system such as the personal computer.

SUMMARY OF THE INVENTION

Considering the problems in the prior art, an object of the present invention is to improve the multimedia capturing apparatus so that the user can operate it in more simple and easy than the prior art.

The object can be achieved by:

(1) making the hand writing stylus pen have functions not only for pointing an icon and/or writing a letter or an image on a write and display tablet provided in the data processing unit but also for capturing image and voice information with an imaging device and a microphone provided in the hand-writing stylus pen, respectively;

(2) providing, to the hand-writing stylus pen, capturing devices of information on image and voice, memory means for storing the captured image and voice data or a text datum sent from the data processing unit, a data transmitter for transmitting the stored image and voice data to the data processing unit or the stored image and voice data and the text data to another data processing unit of another information capturing apparatus or to a computer system such as the personal computer and a data receiver for receiving data from the data processing unit, wherein the text datum is a datum for a comment or message of the user on the captured image and voice data and is made by handling the hand writing stylus pen on a write and display tablet provided in the data processing unit; and (3) providing, to the data processing unit, a data receiver for receiving the image and voice data from the hand writing stylus pen, a data memory for storing the image and voice data or the text datum provided in the data processing unit, a data transmitter for transmitting the data stored in the data memory to the hand writing stylus pen, a write and display tablet for selecting operation menus of the data processing unit by handling the hand writing stylus pen and a central processing unit (CPU) for processing the image and voice data with the write and display tablet so as to produce the captured image on the tablet, the captured voice through a speaker and the text datum and to perform the data transfer between the hand writing stylus pen and the data processing unit in accordance with commands selected from the operation menus.

In accordance with the invented multimedia capturing apparatus, the image and voice information can be captured only by the hand writing stylus pen, so that it is not necessary to provide the imaging device separately from the stylus pen, and the memory and the transmission means are provided in the hand writing stylus pen and the reception means is provided in the data processing unit, so that it is not necessary to carry the data transfer medium separately. Since the capture and the memory of the image and voice information can be performed by the stylus pen, it is not necessary to handle one thing (the imaging device or the image data transfer medium) or another (the stylus pen).

Further, since the memory and the reception means are provided in the hand writing stylus pen and the transmission means is provided in the data processing unit, the stored image and voice data and the text datum provided in the data processing unit can be transferred to another data processing unit or a computer system like a personal computer only by using the hand writing stylus pen, not necessary to carry the image data transfer medium as having done in the prior art.

BRIEF DESCRIPTION OF THE DRAWINGS

FIG. 6 (b) is a block diagram of the data processing unit of the multimedia capturing apparatus firstly embodying the present invention;

DESCRIPTION OF THE PREFERRED EMBODIMENTS

Figure 1:
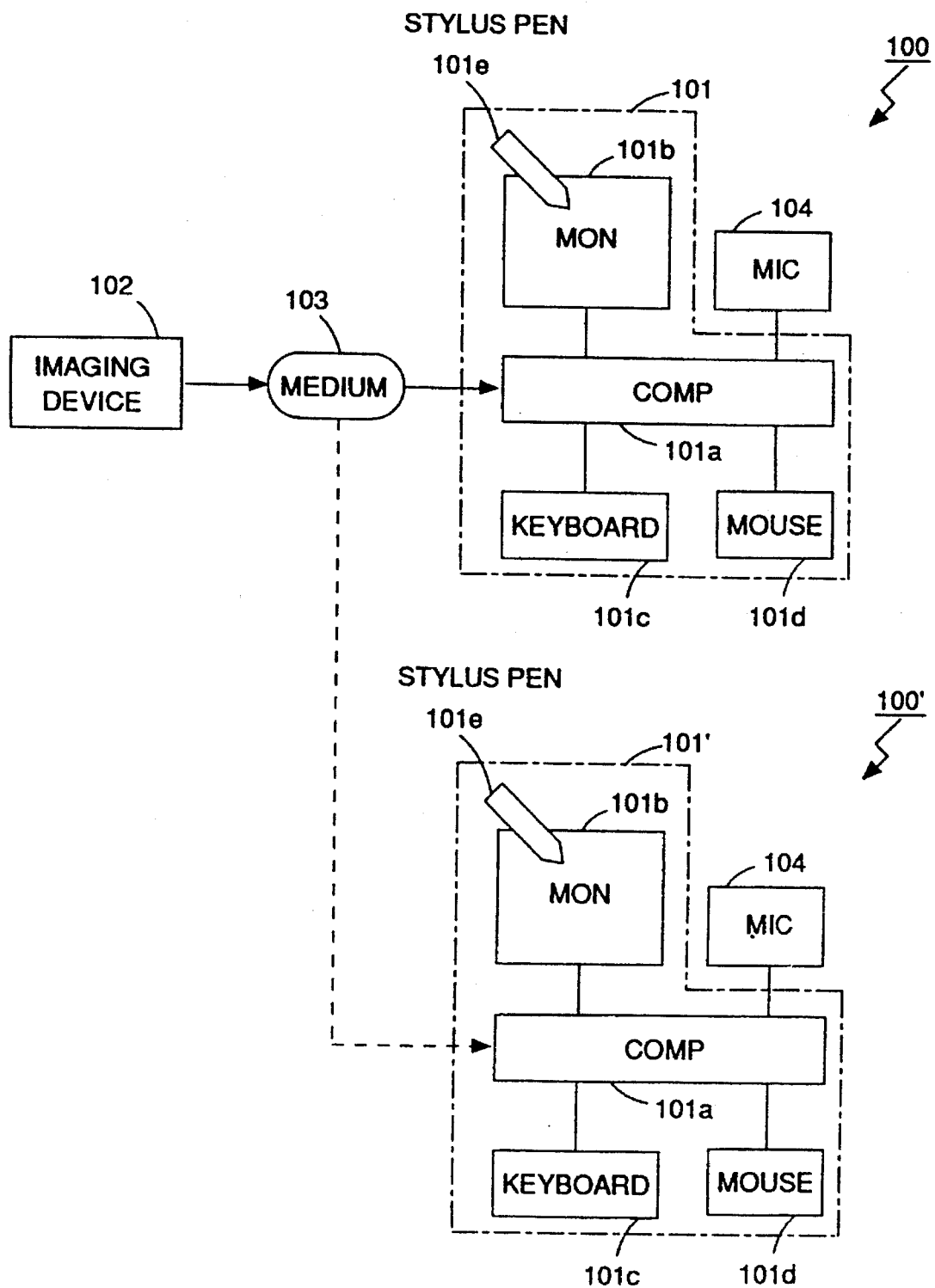
FIG. 1 is a block diagram of a multimedia capturing apparatus of the prior art.

Three preferred embodiments will be explained in reference to FIGS. 2 to 11. In each preferred embodiment, the invented multimedia capturing apparatus consists of a hand writing stylus pen, which will be simply called "stylus pen" hereinafter, and a data processing unit. The stylus pen is used with a write and display tablet provided to the data processing unit. However, in the present invention, the stylus pen has a feature of providing capturing devices of image and voice information, a memory for storing the captured image and voice data and a text datum provided in the data processing unit and transfer means for transferring these data between the stylus pen and the data processing unit.

In the first embodiment, the stylus pen captures the image and voice information, and the data transfer between the stylus pen and the data processing unit is performed by wireless transmission means. Regarding the first embodiment, the principle will be shown in FIGS. 2 and 3, the function will be explained in reference to block diagrams in FIGS. 6 (a) and 6 (b) and the actual equipped situation of units or parts in the stylus pen will be shown in FIG. 7.

In the second embodiment, the stylus pen captures only the image information, and the data transfer is performed by the wireless transmission means only from the stylus pen to the data processing unit. Regarding the second embodiment, the principle will be shown in FIGS. 4 and 5, the function will be explained in reference to FIG. 8 and the actual equipped situation of units or parts in the stylus pen will be shown in FIG. 9.

In the third embodiment, same as the second embodiment, the stylus pen captures only the image information, and the image data transfer is performed from the stylus pen to the data processing unit by cables, not the wireless transmission means. Regarding the third embodiment, the principle is same as the principle of the second embodiment, the function will be explained in reference to FIG. 10 and the actual equipped situation of units or parts in the stylus pen will be shown in FIG. 11.

In FIGS. 2 to 11, the same reference numeral designates the same unit or part. As explained above, since the main functions of the three embodiments are similar to each other, the first embodiment will be detailed.

Figure 2:
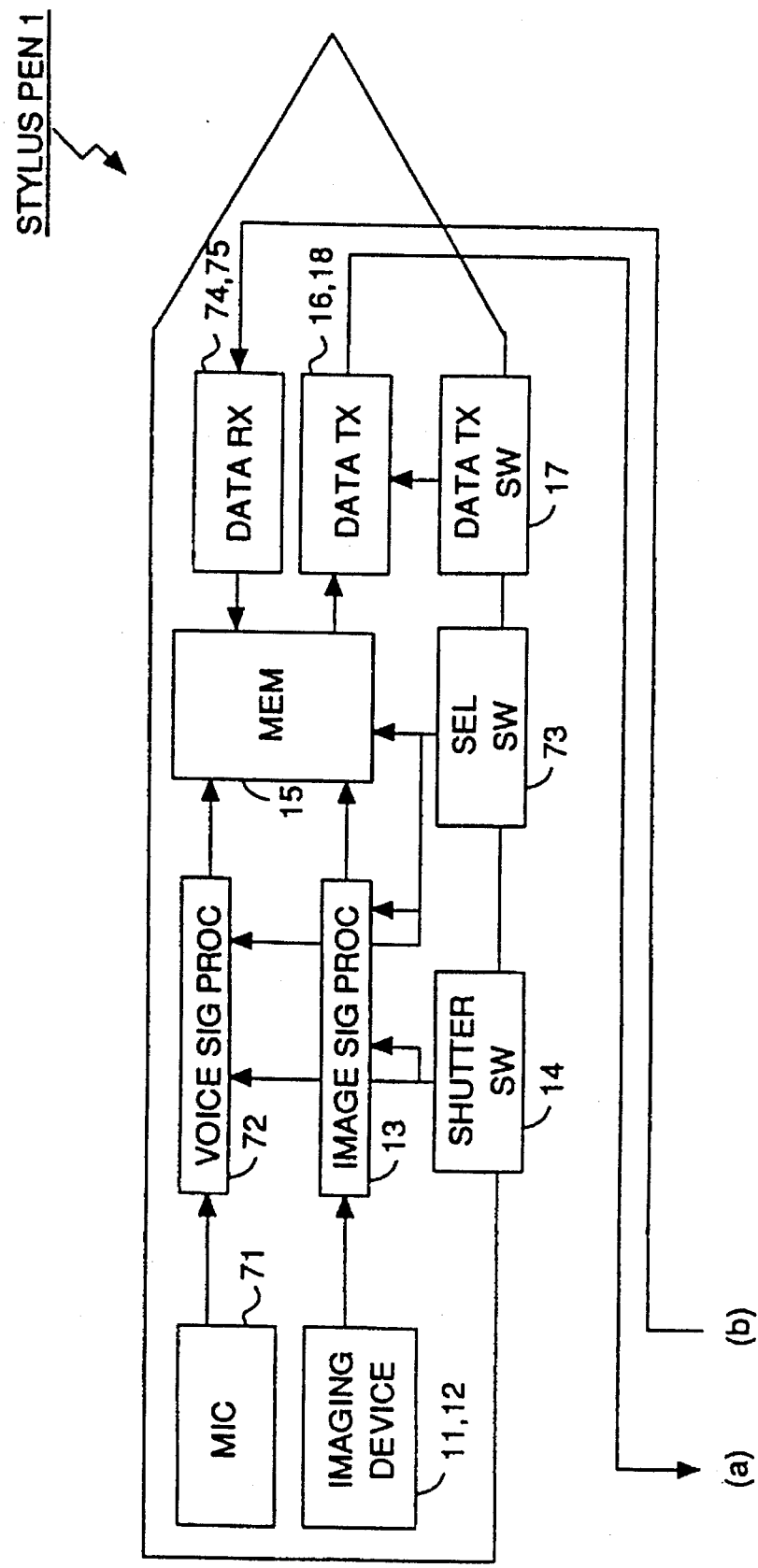
FIG. 2 is a block diagram of a hand writing stylus pen of an invented multimedia capturing apparatus, for showing the principle of the present invention.

The principle of the first embodiment will be explained in reference to FIGS. 2 and 3. In FIG. 2, in order to capture the image information, the user aims a hand writing stylus pen (STYLUS PEN) 1 to an object, selects a select switch (SEL SW) 73 and pushes a shutter button switch (SHUTTER SW) 14, so that an imaging device (IMAGING DEVICE) (11, 12) takes an image of the object. Then an image signal from IMAGING DEVICE (11, 12) is sent to a memory (MEM) 15 through an image signal processor (IMAGE SIG PROC) by which the image signal from IMAGING DEVICE (11, 12) is converted to an image datum to be stored in a memory which will be explained later.

Figure 3:
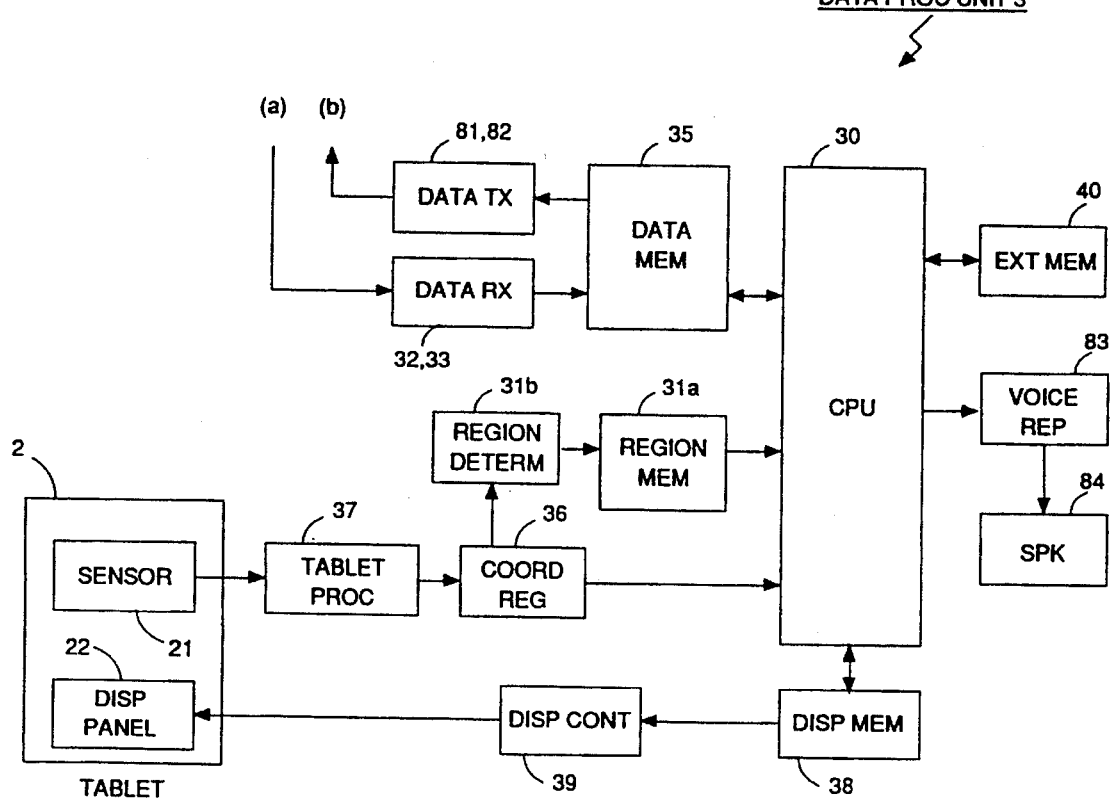
FIG. 3 is a block diagram of a data processing unit, associated with the hand writing stylus pen shown in FIG. 2, of an invented multimedia capturing apparatus, for showing the principle of the present invention.

Then, in FIG. 3, the user instructs a tablet sensor (SENSOR) 21 of a write and display tablet (TABLET) 2 in a data processing unit (DATA PRO UNIT) 3 so that a display position of the image datum is determined on a display panel (DISP PANEL) 22 of TABLET 2. When the user instructs thus, a tablet signal processor (TABLET PROC) 37 converts the output signal of SENSOR 21 into values to be set on coordinates, which will be simply called "coordinates values" hereinafter, so that the coordinates values are stored into a coordinates register (COORD REG) 36. A display region determining circuit (REGION DETERM) 31b determines a display region of the captured image by reading the coordinates values from COORD REG 36 and stores the datum for the display region into a display region memory (REGION MEM) 31a.

Next, when the user pushes a data transmission button switch (DATA Tx SW) 17 in STYLUS PEN 1, a data transmitter (DATA Tx) (16 and 18) in STYLUS PEN 1 reads the image datum from MEM 15 and transmits the read image datum to DATA PROC UNIT 3, as shown in FIG. 2. The image datum transmitted from STYLUS PEN 1 is received at a data receiver (DATA Rx) (32 and 33) and stored into a data memory (DATA MEM) 35 in DATA PROC UNIT 3 as shown in FIG. 3.

In DATA PROC UNIT 3 in FIG. 3, when the image datum is stored in DATA MEM 35, a central processing unit (CPU) 30 reads the image datum and transfers the read image datum from DATA MEM 35 to a display memory (DISP MEM) 38 so as to be stored in a region read from REGION MEM 31a. Then CPU 30 transfers the image datum stored in DISP MEM 38 to DISP PANEL 22.

When voice is required to be captured, the user selects the voice capture by turning SEL SW 73 and pushing SHUTTER SW 14. Then, a voice signal processor (VOICE SIG PROC) 72 processes an analog voice signal from a microphone (MIC) 71 to a digital voice datum so as to be stored in MEM 15. When the user pushes SHUTTER SW 14 again, VOICE SIG PROC 72 stops sending the voice datum to MEM 15.

Then, in FIG. 3, the user designates an indication position of an icon for the voice datum by handling STYLUS PEN 1 on SENSOR 21, so that SENSOR 21 produces an icon datum for the voice datum. Instructing thus, TABLET PROC 37 converts the output signal from SENSOR 21 to coordinates values for the icon datum. The coordinates values are registered into COORDINATES REG 36. While the coordinates values are registered, REGION DETERM 31b reads the coordinates values from COORDINATES REG 36 and determines a voice data region to display the icon. When the voice data region is stored into REGION MEM 31a, CPU 30 transfers the icon datum, which is stored in a memory not depicted in FIG. 3, to DISP MEM 38 in accordance with the voice data region read from REGION MEM 31a.

When the user pushes DATA Tx SW 17 in STYLUS PEN 1 shown in FIG. 2, DATA Tx (16 and 18) reads the voice datum from MEM 15 and transmits it to DATA PROC UNIT 3. In DATA PROC UNIT in FIG. 3, DATA Rx (32 and 33) receives the voice datum sent from STYLUS PEN 1 and stores it into DATA MEM 35.

If the user requires to listen the voice information on the voice datum stored in DATA MEM 35, the user selects an icon for the voice datum by handling STYLUS PEN 1 on DISP PANEL 22. Doing thus, CPU 30 reads the voice datum from DATA MEM 35 and transfers the read voice datum to a voice reproducing circuit (VOICE REPRO) 83 connected to a speaker (SPK) 84. Then, the user can hear the voice through SPK 84. Generally, the voice information includes not only a talk of others but also the user's aural information such as the results of his interview and the telephone numbers the user heard.

Further, the user can input his letter and/or image to SENSOR 21 by handling STYLUS PEN 1 on SENSOR 21. Doing thus, the data for the letter and/or image are stored in a memory not depicted in FIG. 3 and TABLET PROC 37 converts the output from SENSOR 21 to coordinates values so as to be stored in COORD REG 36. Then, CPU 30 transfers the data on the letter and/or image to DISP MEM 38 by using the coordinates values read from COORD REG 36. A display control circuit (DISP CONT) 39 reads the data on the letter and/or image from DISP MEM 38 and controls DISP PANEL 22 so as to display the data on DISP PANEL 22.

Further, the data stored in DATA MEM 35 and DISP MEM 38 can be stored in an external memory (EXT MEM) 40 by the operation of CPU 30. The data in EXT MEM 40 are transferred back to DATA MEM 35 and DISP MEM 38 for displaying the data on DISP PANEL 22 in response to the user requirement.

Still further, a data transmitter (DATA Tx) (32 and 33) in DATA PROC UNIT 3 and a data receiver (DATA Rx) (74 and 75) in STYLUS PEN 1 are for transferring the image and voice data in DATA MEM 35 to MEM 15 in STYLUS PEN 1. The image and voice data stored in MEM 15 can be transferred to DATA MEM 35 in another DATA PROC UNIT 3. In other words, STYLUS PEN 1 can be used as if it were a data transferring media, requiring no floppy desk or IC memory as used in the prior art.

Figure 4:
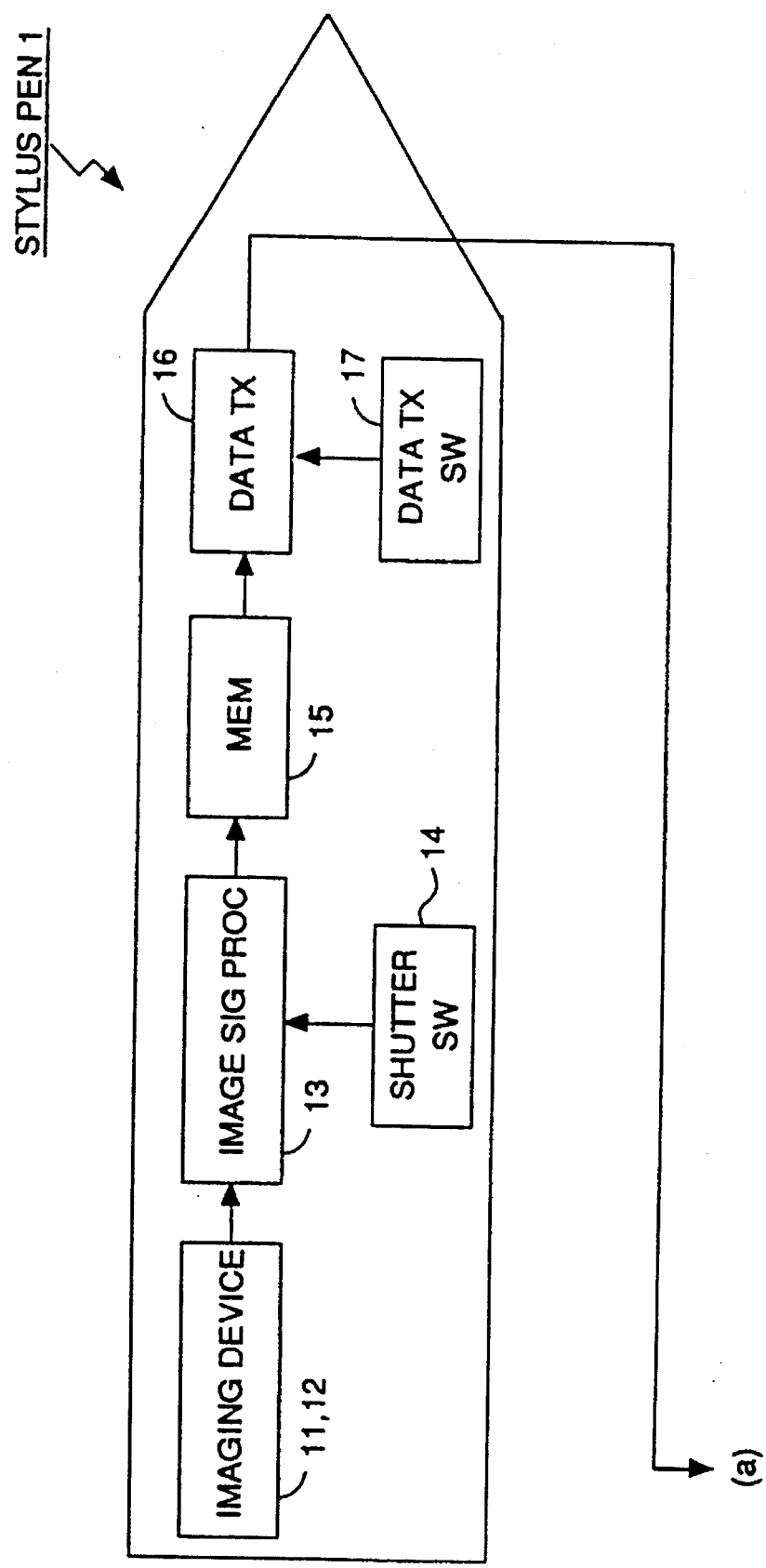
FIG. 4 is a block diagram of another hand writing stylus pen of an invented multimedia capturing apparatus, for showing the principle of the present invention.
Figure 5:
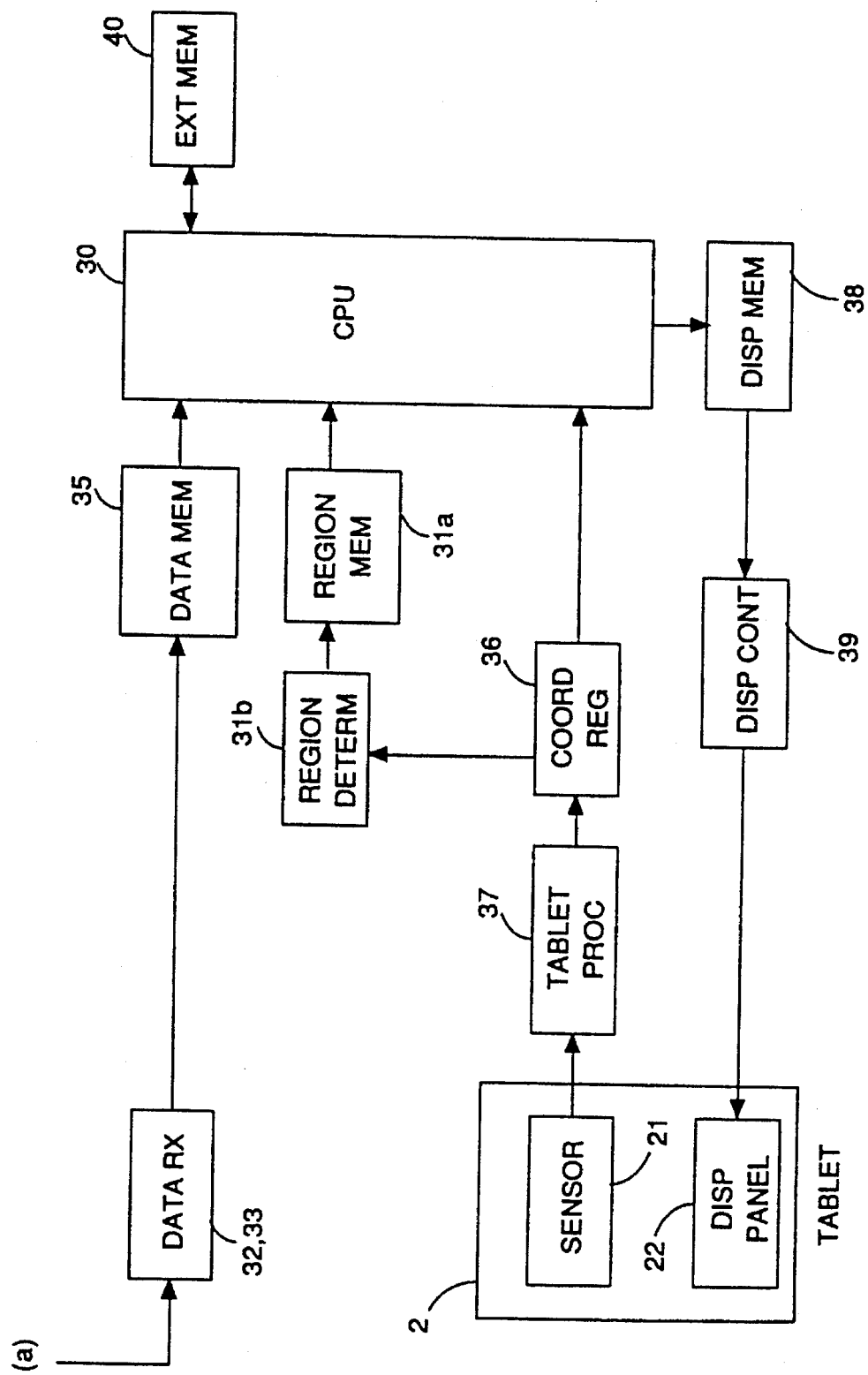
FIG. 5 is a block diagram of another data processing unit, associated with the hand writing stylus pen shown in FIG. 4, of an invented multimedia capturing apparatus, for showing the principle of the present invention.

The principle of the second and third embodiment is same as the principle of the first embodiment except that there are no device and circuit concerning the voice information in STYLUS PEN 1 and DATA PROC UNIT 3 and there is no data transmission means between DATA PROC UNIT 3 and STYLUS PEN 1, as shown in FIGS. 4 and 5. In STYLUS PEN 1 in FIG. 4, means for capturing the image information and storing and transmitting the image data are same as in the first embodiment shown in FIG. 2, and in DATA PROC UNIT 3 in FIG. 3, means for receiving and storing the image data and processing the image data for displaying the image data on TABLET 2 by operating STYLUS PEN 1 are same as in the first embodiment shown in FIG. 3.

Therefore, the first embodiment will be detailed below in reference to FIGS. 6(a), 6(b) and 7.

Figure 6A:
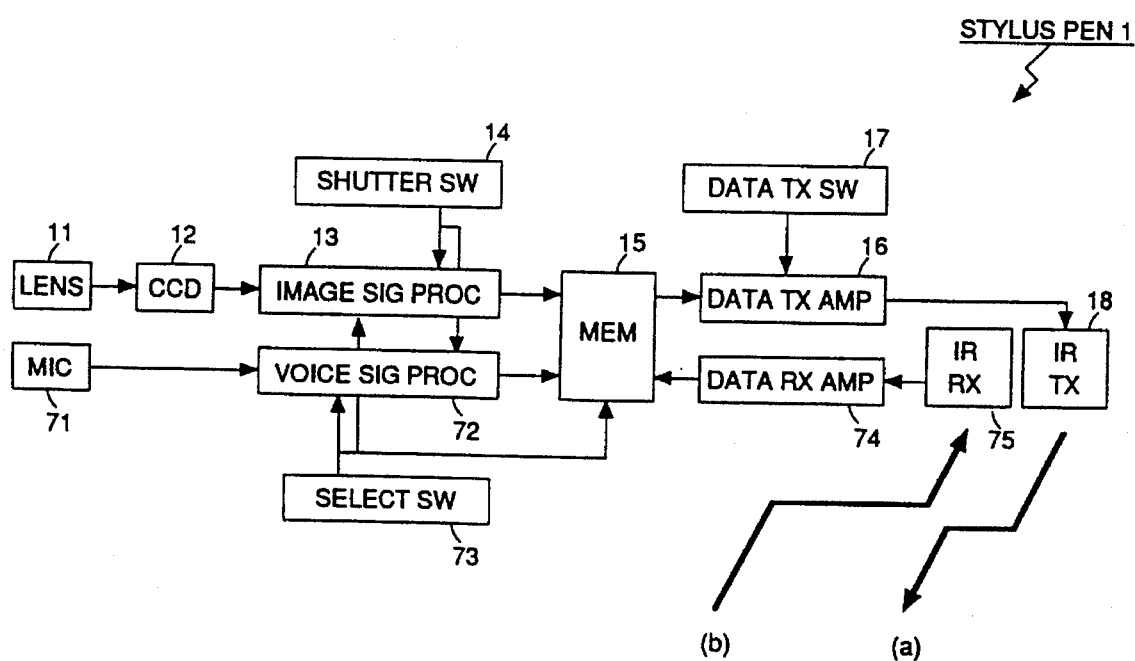
FIG. 6 (a) is a block diagram of the stylus pen of the multimedia capturing apparatus firstly embodying the present invention.

In STYLUS PEN 1 shown in FIG. 6(a), IMAGING DEVICE (11 and 12) in FIG. 2 consists of a lens (LENS) 11 and a charge coupled diode type electronic imaging device (CCD) 12. The output from CCD 12 is converted, by IMAGE SIG PROC 13, to a digital image signal formed so as to be stored into MEM 15 and stored in MEM 15 as an image datum. The DATA Tx (16 and 18 in FIG. 2) consists of a data transmission amplifier (DATA Tx AMP) 16 and an infrared transmitter (IR Tx) 18, and DATA Rx (74 and 75) consists of a data receive amplifier (DATA Rx AMP) 74 and an infrared receiver (IR Rx) 75.

Figure 6B:
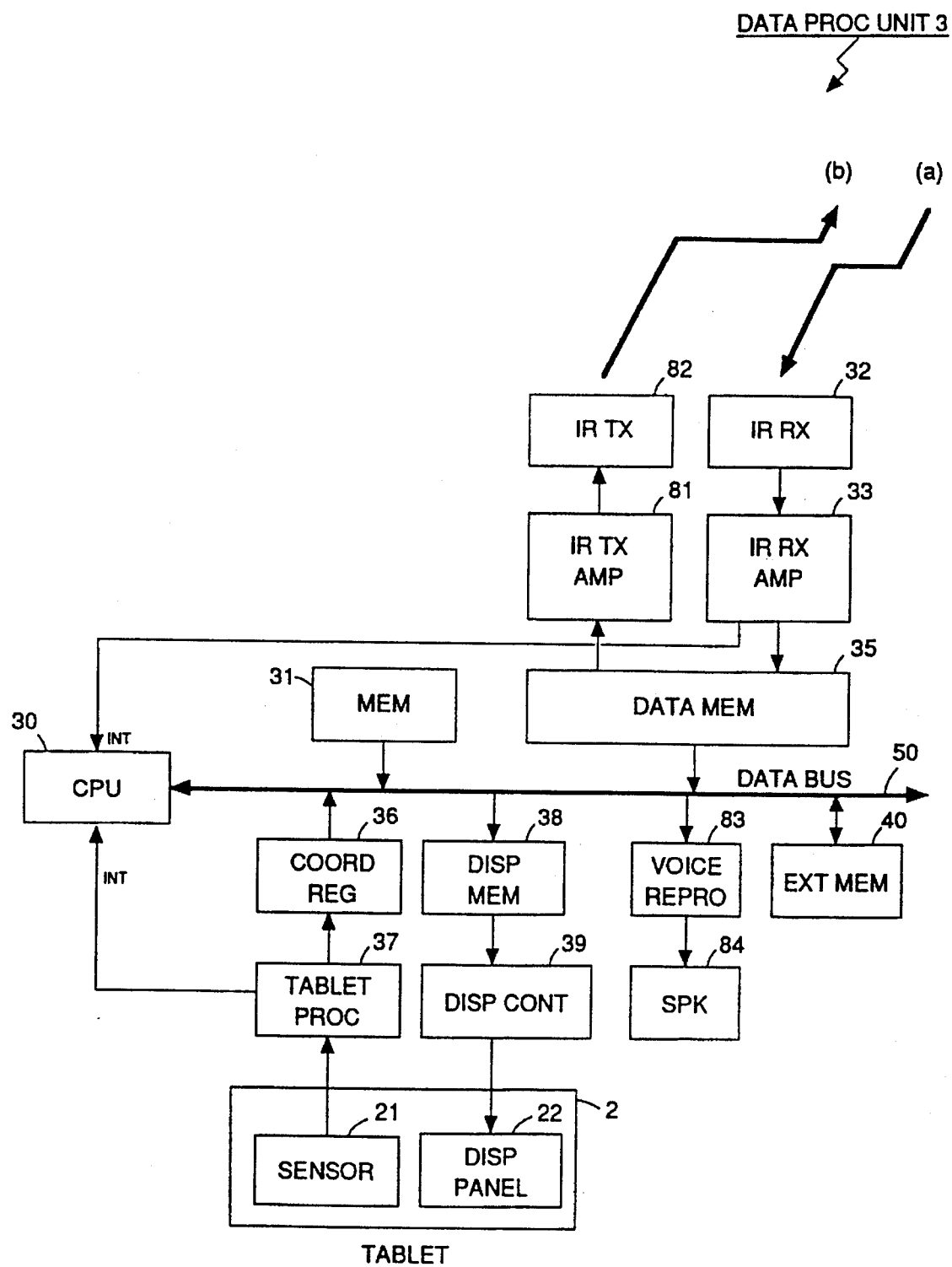

In DATA PROC UNIT 3 shown in FIG. 6(b), DATA Rx (32 and 33) in FIG. 2 consists of an infrared receiver (IR Rx) 32 and DATA Rx AMP 33, DATA Tx (81 and 82) consists of DATA Tx AMP 81 and an infrared transmitter (IR Tx) 82. These IR Rx 32 and IR Tx 82 in DATA PROC UNIT 3 correspond to IR Tx 18 and IR Rx 75 in STYLUS PEN 1 respectively. Further, in DATA PROC UNIT 3 in FIG. 6(b), there is a data bus (DATA BUS) 50 connected to CPU 30, DATA MEM 35, COORD REG 36, DISP MEM 38, VOICE REPRO 83, EXT MEM 40 and a memory (MEM) 31 which includes REGION MEM 31a and REGION DETERM 31b and stores the program data for CPU 30. The EXT MEM 40 is a hard disc type memory, SENSOR 21 is a pressure type tablet sensor and DISP PANEL 22 is a liquid crystal display panel.

Figure 7:
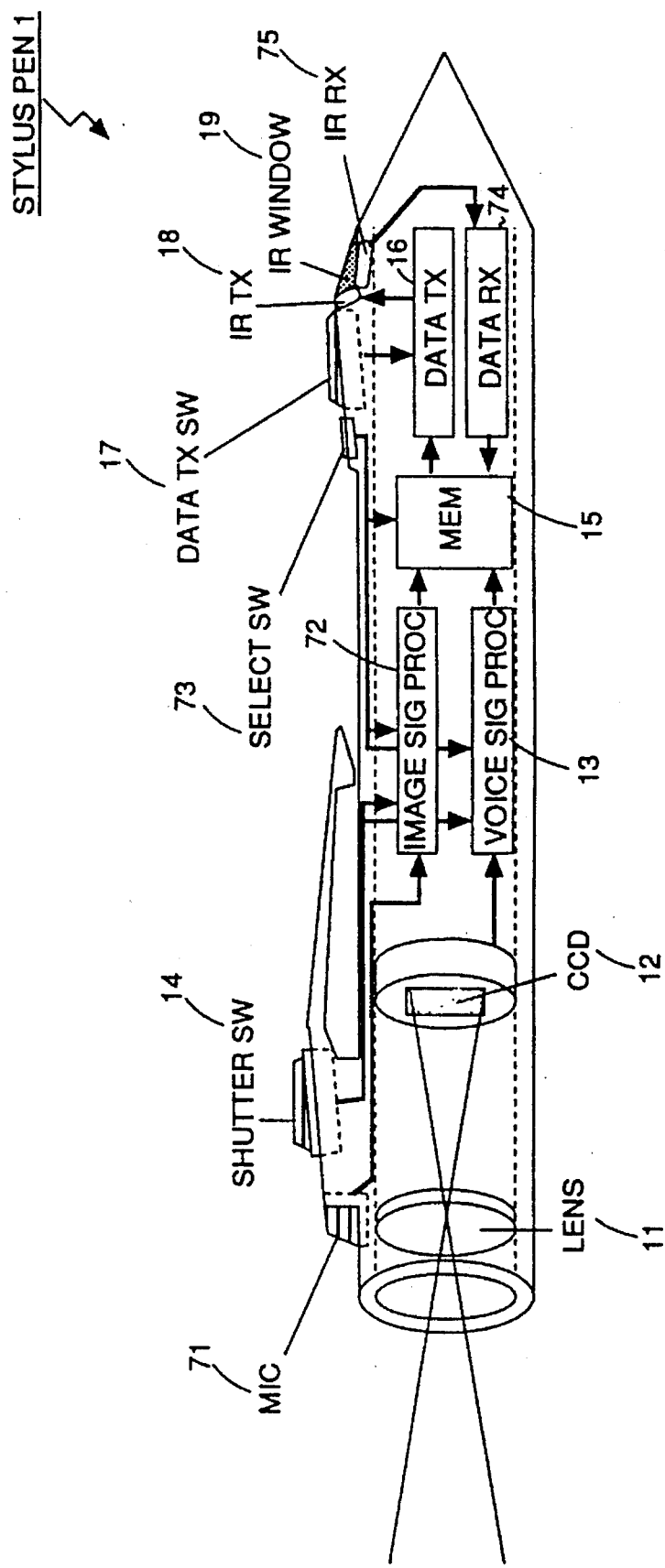
FIG. 7 is an illustration of the hand writing stylus pen of the firstly embodied multimedia capturing apparatus, for illustrating the functional arrangement of the blocks shown in FIG. 6 (a)

As shown in FIG. 7, STYLUS PEN 1 is formed to a pen which can be inserted into a pocket. The LENS 11 and MIC 71 are fixed at the opposite side to a stylus and IR Tx 18 and IR Rx 75 are provided near by the stylus so that the transmitting and receiving infrared rays are passed through an infrared window (IR WINDOW) 19. The arrangement of these LENS 11, MIC 71, IR WINDOW 19 and other switches such as SHUTTER SW 14, SELECT SW 73 and DATA Tx SW 17 is determined in consideration of convenience to the user for capturing image and voice information and transferring the data between STYLUS PEN 1 and DATA PROC UNIT 3.

In FIGS. 6(a) and 6(b), the image datum is obtained by the multimedia capturing apparatus as follows:

When the image information is captured by operating SELECT SW 73 and SHUTTER SW 14 and the image datum is stored into MEM 15, CPU 30 displays operation menus on DISP PANEL 22 by reading from MEM 31, then, the user selects a command of transferring the image datum from STYLUS PEN 1 to DATA PROC UNIT 3, from the operation menus by handling STYLUS PEN 1 on SENSOR 21, so that SENSOR 21 produces a datum on the selection and sends the datum to TABLET PROC 37 so as to convert the datum to coordinates values. At the same time, TABLET PROC 37 sends an interrupt request to CPU 30, which is shown by a connection line having an "INT" mark;

after receiving the interrupt request, CPU 30 reads the coordinates values from COORD REG 36 through DATA BUS 50 and processes the selected menu in accordance with a program previously stored in MEM 31, that is, during the user instructs a display region for the captured image on DISP PANEL 22 by handling STYLUS PEN 1 on SENSOR 21, CPU 30 reads the coordinates value and stores the value into REGION MEM 31a in MEM 31 one by one so that the display region of the captured image is completely designated;

next, because DATA Tx SW 17 is turned on by the user, the image datum stored in MEM 15 in STYLUS PEN 1 is transferred to DATA MEM 35 through IR Tx 18 and IR Rx 32, and when the received image datum passes through DATA Rx AMP 33 in DATA PROC UNIT 3, DATA Rx AMP 33 sends an interrupt request to CPU 30, which is shown by a connecting line having a mark "INT" in FIG. 6(b); and after receiving the interrupt request, CPU 30 transfers the image datum from DATA MEM 35 to a region, which corresponds to the region datum stored in REGION MEM 31a in MEM 31, of DISP MEM 38, and the DISP CONT 39 reads out the image datum from DISP MEM 38 so as to display the captured image onto DISP PANEL 22.

In FIGS. 6(a) and 6(b), the voice datum is obtained by the multimedia capturing apparatus as follows:

When the voice information is captured by operating SELECT SW 73 and SHUTTER SW 14 and the voice datum is stored into MEM 15, CPU 30 displays operation menus on DISP PANEL 22 by reading from MEM 31;

then, the user selects a command of transferring the voice datum from STYLUS PEN 1 to DATA PROC UNIT 3, from the operation menus by handling STYLUS PEN 1 on SENSOR 21, so that SENSOR 21 produces a datum on the selection and sends the datum to TABLET PROC 37 so as to convert the datum to coordinates values, and at the same time, TABLET PROC 37 sends an interrupt request to CPU 30;

then, the user selects a menu, "transfer the voice datum from STYLUS PEN 1 to DATA PROC UNIT 3", from the operation menus and points an icon for the voice datum by handling STYLUS PEN 1 on SENSOR 21, so that TABLET PROC 37 sends an interrupt request to CPU 30;

receiving the interrupt request, CPU 30 transfers an icon datum previously stored in MEM 31, to a position, which corresponds to the position stored in REGION MEM 31a, of DISP MEM 38;

then, DISP CONT 39 reads the icon datum from DISP MEN 38 and displays the icon for the voice datum on DISP PANEL 2; and when CPU 30 detects the user selection of the icon for the voice datum, CPU 30 transfers the voice datum from DATA MEM 35 to VOICE REPRO 83, so that the captured voice can be reproduced from SPK 84.

Further, a hand writing letter or image concerning the captured image or voice can be input to the multimedia capturing apparatus by the user with STYLUS PEN 1 handled on SENSOR 21. When the user handles STYLUS PEN 1 on SENSOR 21 for writing the letter or drawing the image, SENSOR 21 sends an interrupt request to CPU 30. Receiving the interrupt request, CPU 30 reads the coordinates values from COORD REG 36 and transfer the datum on the hand writing letter or image to DISP MEM 38 in accordance with the address corresponding to the read coordinates values. Because of the control of DISP CONT 39, the hand writing letter or image datum is sent from DISP MEM 38 to DISP PANEL 22 on which the user letter or image is displayed. The hand writing letter or image datum is equal to the text datum explained before.

Further, the captured image and/or voice information can be reserved by transferring the image and/or voice data from DATA MEM 35 and DISP MEM 38 to EXT MEM 40. The reserved data can be restored to the captured image on DISP PANEL 22 and to the captured voice through SPK 84. Since the operation menus are always displayed on DISP PANEL 22 as far as no interrupt request is sent to CPU 30, the data reservation and restoration can be performed by selecting a reservation command and a restoration command from the operation menus respectively, handling STYLUS PEN 1 on SENSOR 21, looking DISP PANEL 22.

Still further, STYLUS PEN 1 can be used as the data transfer medium from DATA PROC UNIT 3 to the computer system such as the personal computer or between DATA PROC UNITs 3. The transferred object is the data on the captured image and voice and the text datum. The IR Tx AMP 81 and IR Tx 82 in DATA PROC UNIT 3 and IR Rx 75 and IR Rx AMP 74 in STYLUS PEN 1 are used for transferring the data stored in DATA MEM 35 or EXT MEM 40 in DATA PROC UNIT 3 to MEM 15 in STYLUS PEN 1. Such data transfer from DATA PROC UNIT 3 to STYLUS PEN 1 is performed by CPU 30 operating under a command corresponding to the data transfer, selected from the operation menus by handling STYLUS PEN 1 on SENSOR 21, looking DISP PANEL 22.

Figure 8:
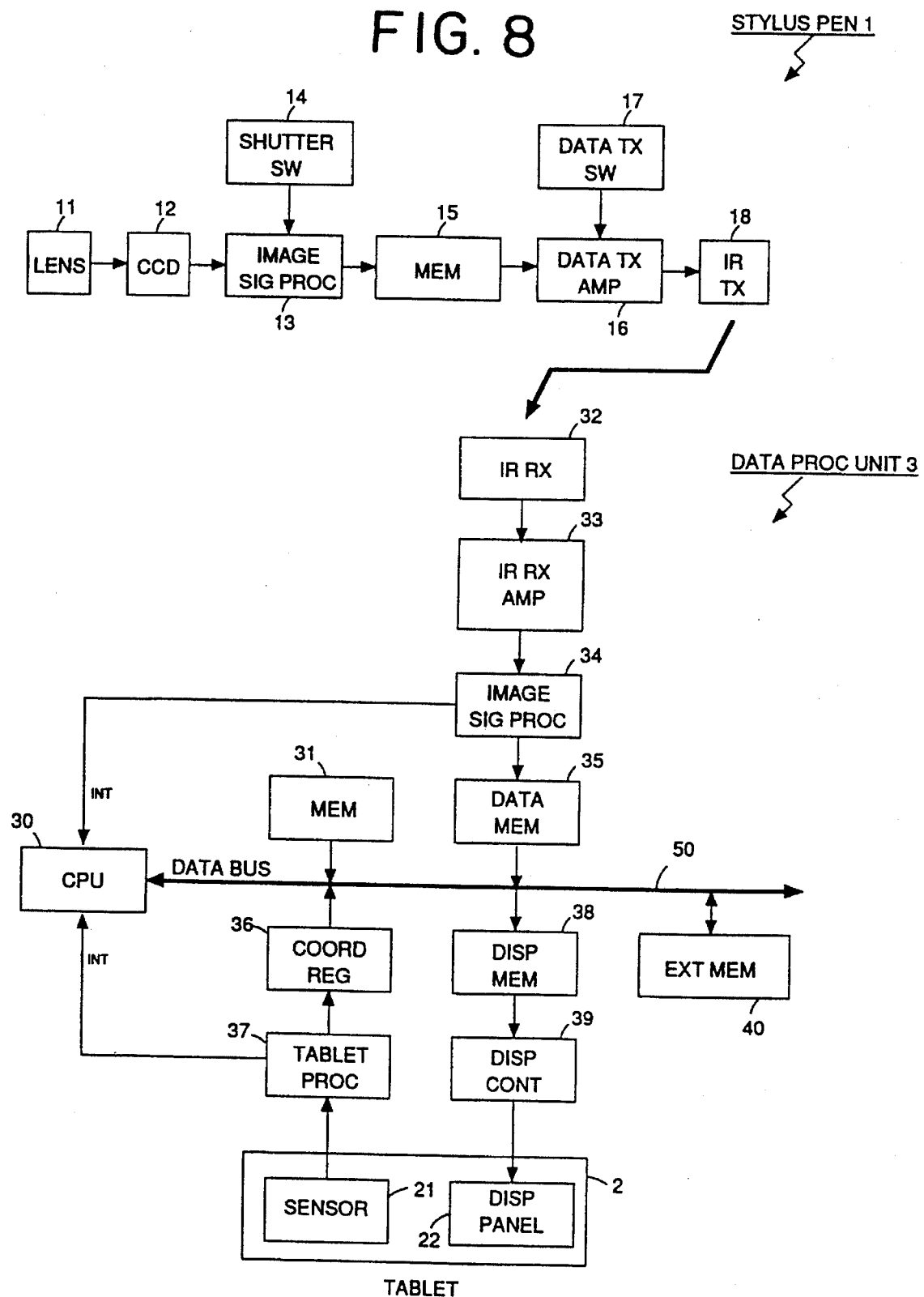
FIG. 8 is a block diagram of the multimedia capturing apparatus secondly embodying the present invention.
Figure 9:
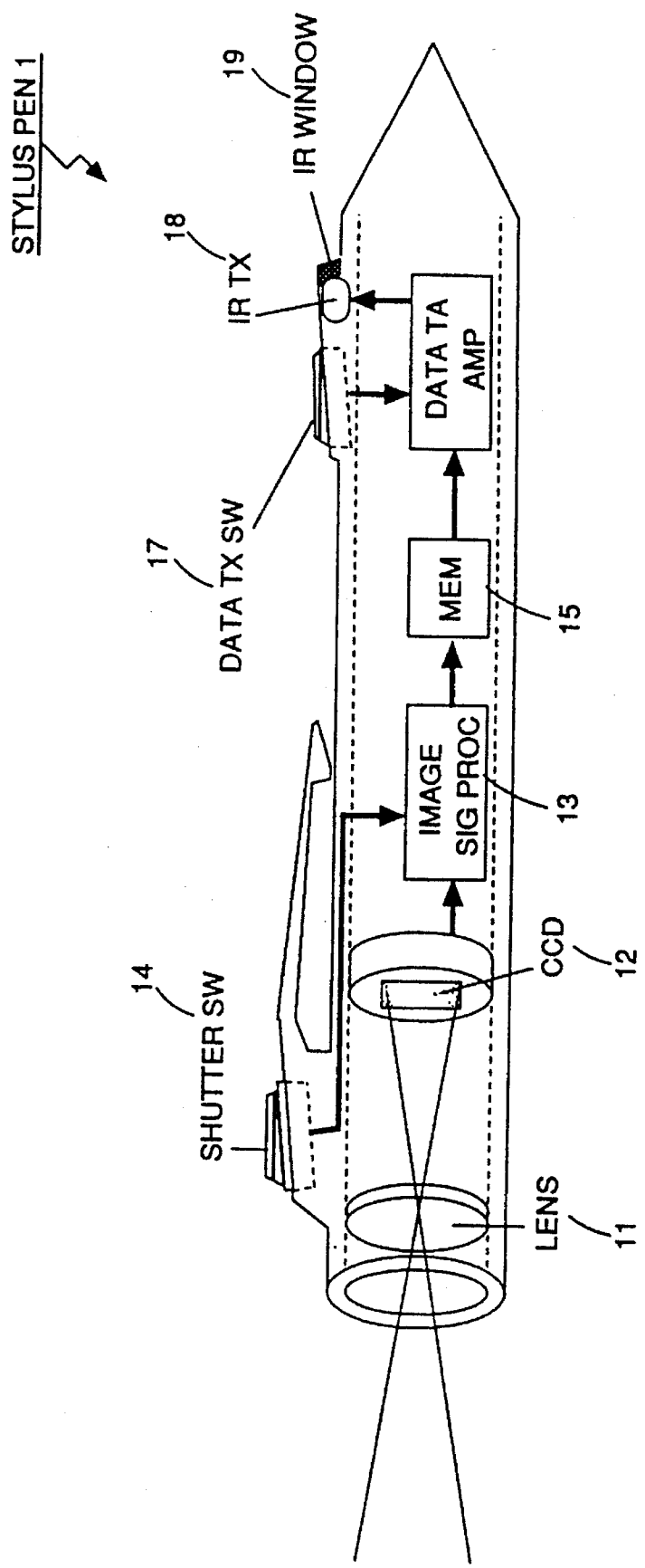
FIG. 9 is an illustration of the hand writing stylus pen of the secondly embodied multimedia capturing apparatus, for illustrating the functional arrangement of the blocks of the hand writing stylus pen shown in FIG. 8.

In the first embodiment, the multimedia capturing apparatus captures and processes the image and voice information. However, in the second embodiment, only the image information is captured. The second embodiment is same as the first embodiment as far as the capture and process of the image information and data as shown in FIGS. 8 and 9. Therefore, the explanation of the second embodiment is omitted.

The third embodiment will be explained in reference to FIGS. 10 and 11. In the third embodiment, the multimedia information is limited to the image information, however, it is a matter of course that the voice information can be treated in the third embodiment. The main difference of the third embodiment from other first and second embodiments is that an electrically connecting cable (CONN CABLE) 7 is used instead of wireless means and no MEM 15 in STYLUS PEN 1 because of simplicity.

Figure 10:
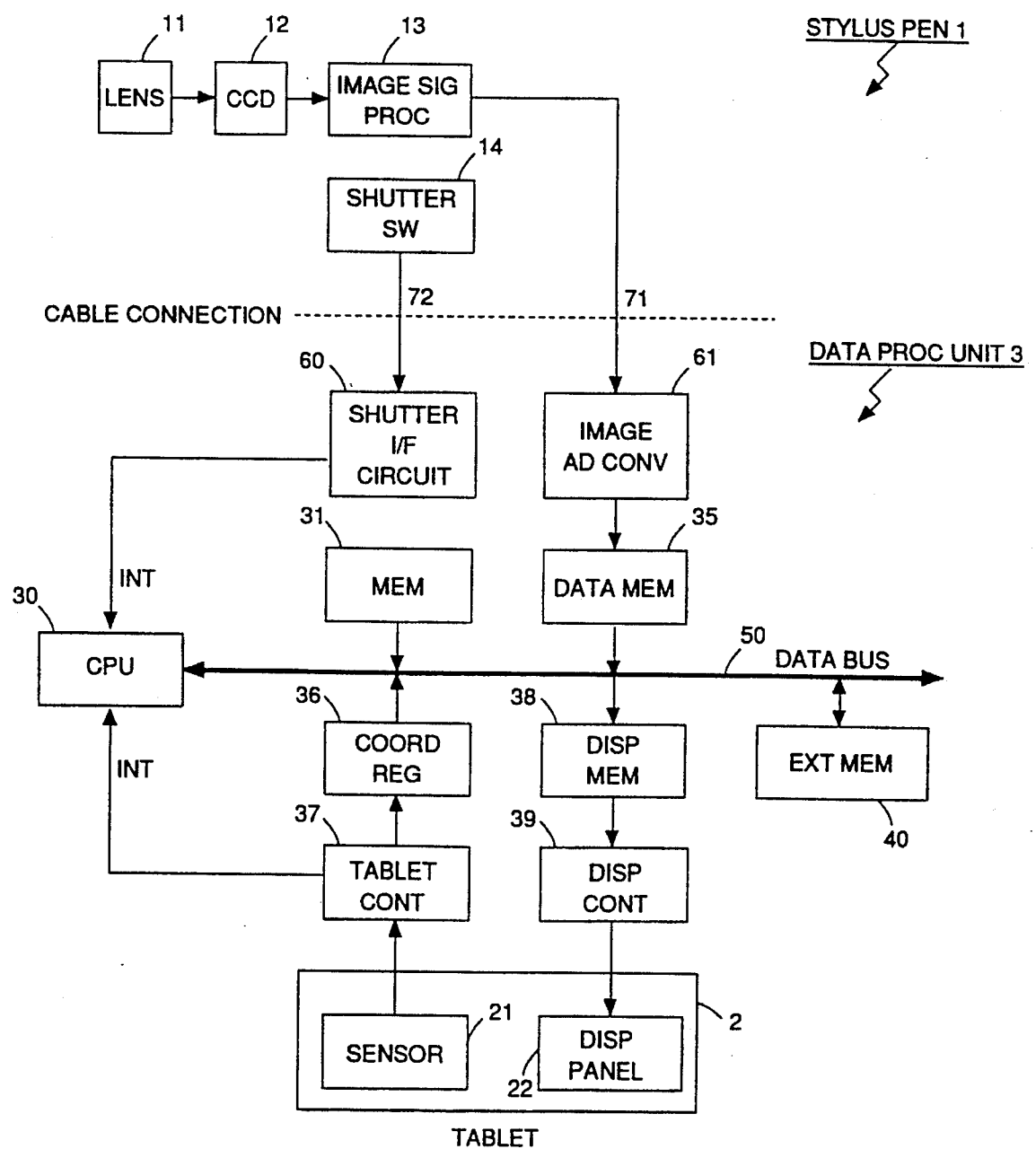
FIG. 10 is a block diagram of the multimedia capturing apparatus thirdly embodying the present invention.
Figure 11:
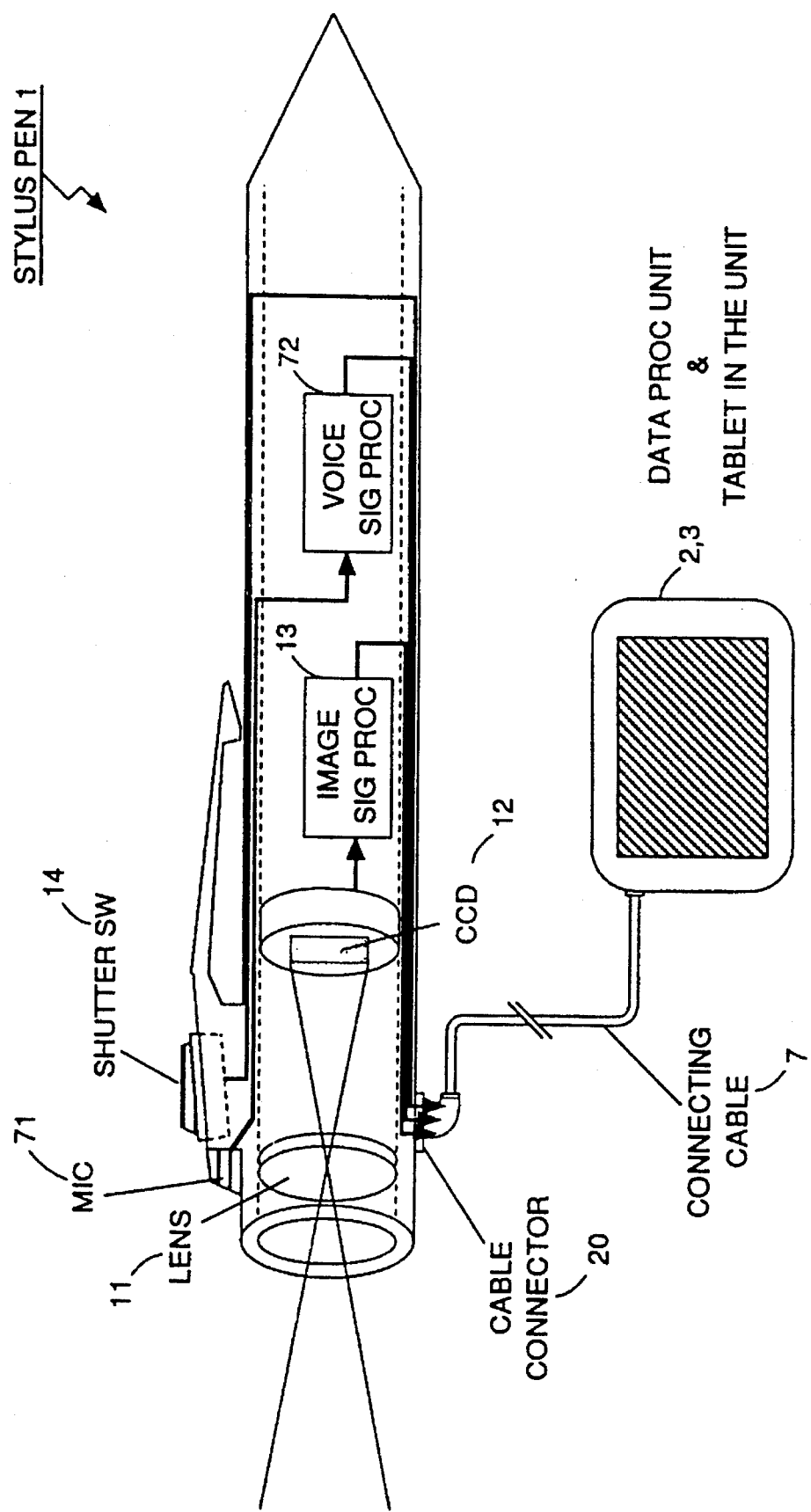
FIG. 11 is an illustration of the hand writing stylus pen of the thirdly embodied multimedia capturing apparatus, for illustrating the functional arrangement of the blocks of the hand writing stylus pen shown in FIG. 10.

In STYLUS PEN 1 in FIG. 10, the digital output signal from CCD 12 is sent to IMAGE SIG PROC 19 in which the output signal from CCD 12 is processed to an analog signal suitable for transferring from STYLUS PEN 1 to DATA PROC UNIT 3 through CONN CABLE 7 with small loss. The output signal from IMAGE SIG PROC 19 is sent to IMAGE SIG PROC 61 in DATA PROC UNIT 3 through CONN CABLE 7. In DATA PROC UNIT 3, the output from IMAGE SIG PROC 61 is sent to DATA MEM 35.

On the other hand, the output signal from SHUTTER SW 14 is sent to a shutter interface circuit (SHUTTER I/F CIRCUIT) 60 in DATA PROC UNIT 3 through CONN CABLE 7. When the shutter button of SHUTTER SW 14 is pushed, SHUTTER I/F CIRCUIT 60 sends an interrupt request to CPU 30. Receiving the interrupt request, CPU 30 operates so that the image datum from IMAGE SIG PROC 61 is stored into DATA MEM 35.

Then, the image datum can be displayed on DISP PANEL 22 or reserved into EXT MEM 40 and the reserved image datum can be restored on DISP PANEL 22, by the operation of CPU 30 in accordance with the command selected by the user, from the operation menus by using STYLUS PEN 1 on SENSOR 21 and looking DISP PANEL 22, which is same as done in the first or second embodiment. The hand writing image or letter can be formed on DISP PANEL 22 by handling STYLUS PEN 1 and these image and letter can be processed to the text data to be stored in DATA MEM 35 or EXT MEM 40, which is same as the first or second embodiment.

In the first, second or third embodiment, STYLUS PEN 1 includes at least the imaging device and the circuits associated with the imaging device and DATA PROC UNIT 3 includes CPU and the circuit associated with CPU. However, the constitution of STYLUS PEN 1 and DATA PROC UNIT 3 is not limited to that of the first, second or third embodiment. For example, DATA PROC UNIT 3 can be limited so that DATA PROC UNIT 3 includes only TABLET 2, however, STYLUS PEN 1 includes CPU and the circuits associated with CPU. Such modification does not disturb the concept of the present invention.

What is claimed is:

1. A multimedia information capturing apparatus for capturing multimedia information and storing the multimedia information with a message of the multimedia information, the apparatus comprising:

a hand writing stylus pen for selecting a process for storing the multimedia information and adding the message to the stored multimedia information; and data processing means for performing processes selected by said hand writing stylus pen, said hand writing stylus pen including:

information capture means including first means for optically capturing multimedia information on a visual image and second means for acoustically capturing multimedia information on aural voice and producing by said first and second means captured multimedia information signals indicative of the captured information on the visual image and the captured information on the aural voice, respectively;

signal-to-data conversion means for converting the captured multimedia information signals received from the information capture means into multimedia information data;

memory means, coupled to said signal-to-data conversion means, for temporarily memorizing the multimedia information data;

data transmission means, coupled to said memory means, for receiving and transmitting the multimedia information data memorized in said memory means to said data processing means positioned exteriorly of said hand writing stylus pen;

at least said information capture means, said signal-to-data conversion means, and said data transmission means being positioned inside said hand writing stylus pen;

a select switch provided on said hand writing stylus pen and being coupled to said information capture means, for selecting operation of said information capture means, by selecting either an operation of capturing the visual image or an operation of capturing the aural voice;

a shutter switch provided on said hand writing stylus pen and being connected to said information capture means for making said information capture means start and stop an operation thereof; and a data transmitting switch provided on said hand writing stylus pen and being coupled to said data transmission means, for making said data transmission means operate.

2. A multimedia information capturing apparatus according to claim 1, wherein said hand writing stylus pen further comprises data reception means for receiving multimedia information data on a visual image and aural voice from the exterior of the hand writing stylus pen and being coupled to said memory means for temporarily memorizing the multimedia information data received from said exterior into said memory means.

3. A multimedia information capturing apparatus according to claim 1, wherein said data processing means comprises:

data reception means for receiving the multimedia information data transmitted from said data transmission means of said hand writing stylus pen;

data storage means, coupled to said data receiving means, for storing the multimedia information data received at said data reception means;

write and display means for displaying operation menus of processes to be performed in said data processing means and a visual image produced from the multimedia information data stored in said data storage means and for allowing said hand writing stylus pen to select the operation menus and to write and draw the message of the multimedia information by placing said hand writing stylus pen against said write and display means;

voice reproduction means for reproducing the aural voice from the multimedia information data stored in said data storage means; and data control and process means, coupled between said data storage means and said write and display means, for effecting displaying the operation menus on said write and display means and performing the processes selected by said hand writing stylus pen placed against said write and display means.

4. A multimedia information capturing apparatus according to claim 3, wherein said hand writing stylus pen includes an additional data reception means and said data processing means further comprises additional data transmission means for transmitting the multimedia information data stored in said data storage means to said additional data reception means of said hand writing stylus pen, said additional data transmission means being operated to transmit the multimedia information data by said data control and process means in accordance with a command selected from the operation menus by placing said stylus pen against said write and display means.

5. A multimedia information capturing apparatus according to claim 2, wherein said data transmission means and data reception means of said hand writing stylus pen comprise wireless transfer means, respectively.

6. A multimedia information capturing apparatus according to claim 4, wherein said data transmission means and data reception means of said hand writing stylus pen and said data transmission means and data reception means of said data processing means comprise wireless transfer means, respectively.

7. A multimedia information capturing apparatus according to claim 2, wherein said data transmission means and data reception means of said hand writing stylus pen comprise infrared ray transfer means, respectively.

8. A multimedia information capturing apparatus according to claim 4, wherein said data transmission means and data reception means of said hand writing stylus pen and said data transmission means and data reception means of said data processing means comprise infrared ray transfer means, respectively.

9. A multimedia information capturing apparatus according to claim 4, wherein said data processing means further comprises external memory means for reserving the multimedia information data stored in said data storage means and the message added to the multimedia information data.

* * * * *